(12) United States Patent
Uschold

(10) Patent No.: US 7,741,422 B2
(45) Date of Patent: *Jun. 22, 2010

(54) PROCESS FOR MAKING VINYL FLUORIDE INTERPOLYMERS AND DISPERSIONS

(75) Inventor: Ronald Earl Uschold, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 95 days.

This patent is subject to a terminal disclaimer.

(21) Appl. No.: 12/044,068

(22) Filed: Mar. 7, 2008

(65) Prior Publication Data

US 2009/0286088 A1 Nov. 19, 2009

Related U.S. Application Data

(62) Division of application No. 10/095,922, filed on Mar. 11, 2002, now Pat. No. 7,378,475, which is a division of application No. 09/058,916, filed on Apr. 13, 1998, now Pat. No. 6,403,740.

(60) Provisional application No. 60/043,556, filed on Apr. 15, 1997.

(51) Int. Cl.
   *C08F 4/04* (2006.01)

(52) U.S. Cl. ............... 526/218.1; 526/247; 526/250; 526/253; 526/254; 526/255

(58) Field of Classification Search .............. 526/218.1, 526/247, 250, 253, 254, 255
   See application file for complete search history.

(56) References Cited

U.S. PATENT DOCUMENTS

| | | | |
|---|---|---|---|
| 2,419,009 A | | 4/1947 | Coffman et al. |
| 2,468,664 A | | 4/1949 | Hanford et al. |
| 2,599,300 A | | 6/1952 | Upson |
| 3,129,207 A | | 4/1964 | James |
| 3,265,678 A | | 8/1966 | Hecht |
| 3,428,618 A | | 2/1969 | Cooke et al. |
| 3,513,116 A | | 5/1970 | Sianesi et al. |
| 3,531,441 A | | 9/1970 | Stilmar |
| 3,637,631 A | | 1/1972 | Sianesi |
| 3,951,913 A | * | 4/1976 | Kometani et al. ........... 525/151 |
| 3,966,660 A | | 6/1976 | Tamura et al. |
| 4,078,135 A | * | 3/1978 | Sulzbach et al. ........... 526/209 |
| 4,146,532 A | * | 3/1979 | Kometani et al. ........... 525/151 |
| 4,569,978 A | | 2/1986 | Barber |
| 4,883,716 A | | 11/1989 | Effenberger et al. |
| 5,229,480 A | | 7/1993 | Uschold |
| 5,284,893 A | * | 2/1994 | Kubo et al. ................ 524/315 |
| 5,308,685 A | | 5/1994 | Froggatt |
| 5,639,837 A | | 6/1997 | Farnham et al. |
| 5,674,957 A | * | 10/1997 | DeSimone et al. ........... 526/89 |
| 5,763,552 A | | 6/1998 | Feiring et al. |
| 5,877,267 A | * | 3/1999 | Greuel et al. ............... 526/225 |
| 6,242,547 B1 | | 6/2001 | Uschold |
| 6,664,338 B2 | * | 12/2003 | Staccione et al. ........ 525/326.3 |

FOREIGN PATENT DOCUMENTS

| | | |
|---|---|---|
| EP | 0006346 | 1/1980 |
| GB | 905879 | 9/1962 |
| GB | 919683 | 2/1963 |
| GB | 941106 | 11/1963 |
| GB | 1039914 | 8/1966 |
| WO | WO 96/28477 | 9/1996 |

OTHER PUBLICATIONS

Dario Sianesi et al, Polymerization and Copolymerization Studies on Vinyl Fluoride, Journal of Polymer Science, Part A-1, vol. 6, pp. 335-352 (1968).

A. KH. Gafurov et al, A Study of Mechanical Heat Stability and Resistance to Thermal Degradation in Copolymers of Vinyl Fluoride with Fluoroethylenes, Polymer Science U.S.S.R. vol. 29, No. 8k, pp. 1895-1901 (1987).

G. Natta et al, Isomorphism Phenomena in Systems Containing Fluorinated Polymers and in New Fluorinated Copolymers, Journal of Polymer Science, Part A, vol. 3, pp. 1263-1278 (1963).

Orr, Size Measurement of Particles, Kirk-Othmer Ency. of Chem. Tech., 3rd ed., John Wiley & Sons, New York, vol. 21, pp. 10-131 (1983).

* cited by examiner

*Primary Examiner*—Bernard Lipman

(57) ABSTRACT

Interpolymers of 1-99 mol % vinyl fluoride and 99-1 mol % of at least one highly fluorinated monomer such as tetrafluoroethylene are disclosed. The interpolymers are characterized by the presence of ionic end groups and are prepared by polymerizing VF and fluorinated monomer in water with water-soluble free-radical initiators such as azoamidine initiators or persulfate initiators at temperatures within the range of 60 to 100° C. and reactor pressures within the range of 1 to 12 MPa (145 to 1760 psi). The invention further provides for protective self-supporting films and coatings formed from nonaqueous dispersions of the interpolymers, both for use on the surfaces of substrates including metal, plastic, ceramic, glass, concrete, fabric and wood.

18 Claims, No Drawings

PROCESS FOR MAKING VINYL FLUORIDE INTERPOLYMERS AND DISPERSIONS

FIELD OF THE INVENTION

The invention is in the field of polymers containing vinyl fluoride units, their preparation and use in making protective coatings and films.

BACKGROUND OF THE INVENTION

Polyvinyl fluoride (PVF) has been manufactured for many years and has found many uses as a protective film or coating over a variety of substrates because of its excellent weatherability, chemical resistance and mechanical properties. The fluorine atoms in PVF are largely responsible for these properties and, if polymers of higher fluorine content could be made, enhancement of these properties would be achieved. One way to increase polymer fluorine content is to prepare dipolymers in which tetrafluoroethylene (TFE) replaces some of the vinyl fluoride (VF). Such dipolymers were first described by Coffman and Ford, U.S. Pat. No. 2,419,009 (1947) and were produced with a benzoyl peroxide initiator in the presence of vinyl fluoride (VF) monomer and water in a high pressure bomb operated at 122-143 atmospheres pressure. This process produces polymer with nonionic phenyl end groups.

Sianesi and Caporiccio, J. Polymer Sci., Part A-1, 6, (1968) 335, and U.S. Pat. No. 3,513,116 (1970) studied the VF/TFE polymerization process in some detail. In all their examples the initiators used by Sianesi and Caporiccio were organometallic compounds whose decomposition was catalyzed by an oxidizing agent to yield alkyl radicals which initiated polymerization. Alcohols or alcohol/water mixtures were commonly used as the polymerization medium in these processes which afforded copolymers at pressures as low as 1 atmosphere. The initiating alkyl radicals of this process result in nonionic end groups on the polymers.

Stilmar, U.S. Pat. No. 3,531,441 (1970), reported preparation of tri- and tetra-polymers composed of VF, TFE and a wide variety of other vinyl monomers by using organic peroxide initiators in different organic solvents as polymerization media. The initiating radicals from the peroxide initiators formed nonionic end groups on the copolymers. Thus, all known previous work has reported the preparation of VF/TFE copolymers, by using radical generating species that place nonionic end groups on the polymer chains formed. These nonionic end groups are typically alkyl or aryl and, therefore, hydrophobic in nature.

The polymerization processes and attendant copolymers produced by the above prior art methods all have some important disadvantages. The process of Coffman and Ford requires high pressures. This demands expensive, robust high-pressure equipment for manufacture of the copolymer. Additionally, since the initiator is nonionic, the copolymer produced is not wetted by water and forms a lumpy heterogeneous mixture in the reactor. Complete removal of the polymer from the reactor is difficult and can only be accomplished by opening the vessel and manually removing it. This is a slow process with some associated danger and is impractical on all but small scale laboratory equipment.

The processes of Sianesi and Caporiccio require the use of flammable alcohol solvents and toxic organometallics such as tetraethyllead which pose some severe health and environmental risks. The polymerization rates reported for these processes are also low and would force the use of very large scale equipment. These requirements demand appropriate plant design for flammable and toxic materials as well as solvent recovery and refining equipment which serve to drive up equipment and operating costs and complicate the overall process.

Cook, et al. U.S. Pat. No. 3,428,618 (1969) teach the use of cyclic azoamidine free radical initiators in a process for polymerizing fluoroolefins. Although they allude to the preparation of dipolymers and terpolymers of fluoroolefins, examples in the patent are directed to the polymerization of VF homopolymer with cyclic 2,2'-azobis(N,N'-dimethyleneisobutyroamidine) dihydrochloride in preference to acyclic 2,2'-azobis(isobutyroamidine)dihydrochloride. Reference to or examples of other homopolymers or interpolymers, specifically VF/TFE interpolymers, is lacking. There is no recognition of producing a superior interpolymer product containing ionic end groups which product has a small uniform particle size and improved weather resistance, chemical resistance, and stain resistance coupled with improved release properties.

SUMMARY OF THE INVENTION

The present invention provides interpolymers containing polymer units derived from 1-99 mol % vinyl fluoride and 99-1 mol % of at least one highly fluorinated monomer, which interpolymers are characterized by the presence of ionic end groups. Further, the invention provides aqueous dispersions of the interpolymers comprising 5 to 30% by weight interpolymer and 95 to 70% by weight water. Further provided are processes for preparing the interpolymers by polymerizing VF and fluorinated monomer in water with water-soluble free-radical initiators, preferably azoamidine initiators or persulfate initiators, at temperatures within the range of 60 to 100° C. and reactor pressures within the range of 1 to 12 MPa (145 to 1760 psi). Nonaqueous dispersions of the interpolymer in polar organic solvents are also provided in accordance with the invention. The invention further provides protective self-supporting films and coatings formed from nonaqueous dispersions of the interpolymers, both for use on the surfaces of metal, plastic, ceramic, glass, concrete, fabric and wood substrates.

DETAILED DESCRIPTION

The compositions of this invention comprise an interpolymer of vinyl fluoride and at least one highly fluorinated monomer, which interpolymer is characterized by ionic end groups. The interpolymer has from 1-99 mol % vinyl fluoride and 99-1 mol % of at least one highly fluorinated monomer.

For the purposes of the present invention, "highly fluorinated" means that 50% or greater of the atoms bonded to carbon are fluorine excluding linking atoms such as O or S. Preferred highly fluorinated monomers useful for this invention include fluoroolefins such as those having 2-10 carbon atoms. Preferred monomers also include fluorinated dioxoles, and fluorinated vinyl ethers such as those having the formula $CY_2=CYOR$ or $CY_2=CYOR'OR$ wherein Y is H or F, and —R and —R' are independently completely-fluorinated or partially-fluorinated alkyl or alkylene groups containing 1-8 carbon atoms and are preferably perfluorinated. Preferred —R groups contain 1-4 carbon atoms and are preferably perfluorinated. Preferred —R'-groups contain 2-4 carbon atoms and are preferably perfluorinated. The most preferred fluoroolefins for use in the present invention have 2-6 carbon atoms and include tetrafluoroethylene (TFE), hexafluoropropylene (HFP), chlorotrifluoroethylene (CTFE), vinylidene fluoride, trifluoroethylene, hexafluoroisobutylene, and perfluorobutyl ethylene. The most preferred dioxoles include perfluoro-2,2-dimethyl-1,3-dioxole (PDD) and perfluoro-2-methylene-4-methyl-1,3-dioxolane (PMD).

A preferred composition is an interpolymer which consists essentially of 10-90 mol % vinyl fluoride units and 90-10% tetrafluoroethylene units, preferably 70-10 mol % tetrafluoroethylene units, most preferably 40-20 mol % tetrafluoroethylene units, also characterized by the presence of ionic end groups. For the purposes of the present invention, "Consists essentially of" means that, while the interpolymer may contain other polymer units, the significant properties of the interpolymer are determined by the named monomer units.

Preferred interpolymers in accordance with the invention have a melt viscosity in the range of 100-1000 Pa·s as determined by the method described herein below. Preferred interpolymers are substantially random interpolymers. The substantially random character of the polymer is indicated by nuclear magnetic resonance spectroscopy.

The process of the present invention is directed to the preparation of interpolymers, including dipolymers, terpolymers and higher interpolymers, of vinyl fluoride and other highly fluorinated monomers by emulsion polymerization using water-soluble free-radical in initiators. The reactions employed in the preparation process provide good polymerization rates at moderate pressures in water and yield well-dispersed aqueous VF/fluoroolefin interpolymer latices, preferably VF/TFE or VF/TFE modified with additional fluoroolefin monomers.

The interpolymers of this invention are prepared by polymerizing VF and fluorinated monomer in water with a water-soluble free-radical initiator at 60 to 100° C. and reactor pressures of 1 to 12 MPa (145 to 1760 psi).

The initiators form ions upon dissolution in aqueous medium, and they introduce ionic end groups into the interpolymers produced. These end groups are derived from initiator fragments which begin the polymerization process. The amount of ionic end groups present in the polymer product is generally not more than 0.05 weight %. Small spherical particles are formed that remain well dispersed in water because of the electrostatic charge on the particle surface arising from the ionic end groups. The electrostatic charge on the particles causes them to repel one another and keeps them suspended in water producing low viscosity interpolymer latices. As a consequence, the latices are fluid and stable enough to be pumped through equipment making the polymerization process easy to operate and control. The invention provides aqueous dispersions of the interpolymers comprising 5 to 30%, preferably 10-15%, by weight interpolymer and 95 to 70%, preferably 90 to 85%, by weight water. Such dispersions can be made more concentrated if desired using techniques which are known in the art.

Initiators useful in this invention are water-soluble free-radical initiators, preferably water-soluble organic azo compounds such as azoamidine compounds which produce cationic end groups or water-soluble salts of inorganic peracids which produce anionic end groups. Most preferred organic azoamidine initiators include 2,2'-azobis(2-amidinopropane) dihydrochloride and 2,2'-azobis(N,N'-dimethyleneisobutyroamidine) dihydrochloride. Most preferred water-soluble salts of inorganic peracids include alkali metal or ammonium salts of persulfate.

For example, 2,2'-azobis(2-amidinopropane) dihydrochloride produces a copolymer with an amidinium ion as an end group and yields copolymer particles with a positive or cationic charge. Similarly, 2,2'-azobis(N,N'-dimethyleneisobutyroamidine) dihydrochloride produces a copolymer with an N,N'-dimethyleneamidinium ion as an end group and yields positively charged or cationic particles. Persulfate initiators place sulfate end groups on the copolymers which yield negatively charged or anionic particles.

Optionally, as well known to those skilled in the art of emulsion polymerization, additional ingredients may be added to the polymerization medium to modify the basic emulsion process. For example, surfactants compatible with the end groups of the polymer are advantageously employed. For instance, perfluorohexylpropylamine hydrochloride is compatible with the cationic end groups present in polymer initiated by bisamidine dihydrochloride; or ammonium perfluorooctanoate or perfluorohexylethane sulfonic acid or its salts can be used with the polymer having anionic end groups initiated by persulfate salts. As known in the art, reducing agents such as bisulfites, sulfites and thiosulfates may be used with persulfates to lower initiation temperatures or modify the structure of the polymer ionic end group. Buffering agents, such as phosphates, carbonates, acetates and the like, may be used with persulfate initiators to control latex pH. The preferred initiators are the azobisamidine dihydrochlorides and ammonium persulfates used in combination with a surfactant, since they produce the whitest copolymers.

The presence of the amidine hydrochloride end groups in the copolymers of this invention is evident from their infrared spectra. The amidine hydrochloride end group in 2,2'-azobis (2-amidinopropane) dihydrochloride absorbs at 1680 cm-1. The presence of this end group in the copolymers is confirmed by the appearance of a band in their infrared spectra at 1680 cm$^{-1}$.

The ionic end groups on interpolymers of the present invention also play a role in nonaqueous dispersions. To be useful as protective surfaces, VF/TFE copolymers are fabricated into films and coatings. This is often done by making a dispersion of the copolymer in a latent solvent which does not dissolve the copolymer at ambient temperatures but which reduces the temperature needed to form continuous films. This greatly facilitates manufacture of thin films 10 μm to 100 μm thick by easily permitting a dispersion of the copolymer to be thinly spread on a substrate at ambient temperatures. The coated substrate is then heated, at which point the latent solvent coalesces the copolymer particles into a continuous solvent-swollen gel, and then evaporates leaving a dry defect-free film. Obviously, dispersion rheology will play an important part in determining the quality of the coating or film produced. It is well known in colloid science that particle size, shape and surface energy are important factors governing dispersion rheology.

The useful latent solvents are generally polar organic liquids like propylene carbonate, N-methylpyrrolidone, γ-butyrolactone, dimethylacetamide, dimethylsulfoxide and the like which have surface tensions near or above 35 dyne/cm. The surface tension of PVF and VF/TFE interpolymer films have been measured and it is found that the surface tensions decrease from 38 dyne/cm for PVF to about 26 dyne/cm for interpolymers containing 40 mol % TFE. The presence of ionic end groups on the interpolymer particle surface increases the surface energy of the particle so that it is wetted by the coalescing solvent, thus aiding in their dispersion. There may also be some electrostatic stabilization of these dispersions arising from the surface charge. In addition, the interpolymer particles of the present invention are submicrometer in size, preferably having an average diameter of 200 to 400 nm. The particles also preferably have a narrow uniform size distribution. Preferably, at least 90% of the interpolymer particles are within a range between plus or minus 10% of the average particle diameter, and more preferably, between plus or minus 5% of the average particle diameter. The interpolymer particles are preferably substantially spherical in shape. By substantially spherical is meant that the ratio of the average diameter of the particles along the major and minor axes is from 1.0:1 to 1.3:1. This morphology will allow high concentrations of interpolymer particles to be dispersed in the latent solvent while maintaining viscosities convenient for coating. In summary, the interpolymer particles with ionic end groups have a good balance of properties which facilitate the preparation of interpolymer dispersions. This allows production of uniform, low viscosity dispersions of the interpolymer particles which can then be used to coat articles or cast high quality thin films. Typically, viscosities measured for dispersions in latent solvents containing 20-40 wt. % polymer particles at 25° C. with a cone and plate rheometer at a shear rate of 2 per second will be in the range 500 to 10,000 centipoise (0.5 to 10 Pa·s), preferably 1500 to 3500 centipoise (1.5 to 3.5 Pa·s).

The absence of ionic end groups on the interpolymers of the prior art produce particles with low surface energy that are poorly wetted by the solvent. As a consequence, they tend to agglomerate when dispersed in latent solvents and produce coatings or films with defects. Interpolymers with nonionic phenyl end groups prepared by the method of Coffman and Ford produce interpolymer particles which vary in size from submicrometer to greater than 10 μm. The particles have irregular shapes and often contain channels and voids. As a consequence, particles can interlock with one another affecting dispersion viscosity. Films cast from these dispersions have a very undesirable appearance—being discolored and full of defects known as craters.

As is evident by the above discussion, the vinyl fluoride interpolymer compositions of this invention can be used to make high quality protective films and coatings on a wide variety or substrates such as metal, plastic, ceramic, glass, concrete, fabric and wood. Techniques for producing such films include conventional methods of casting, dipping, spraying and painting. Normally films are deposited as wet dispersions or solutions and subsequently dried and coalesced thermally. Dispersions of this invention are also suitable for preparing powder coatings, for example, spray drying a dispersion will produce powder particles that can be electrostatically sprayed onto a substrate and fused to form a uniform coating.

Test Methods

Polymer Composition

Polymer composition was determined by $^{19}$F-nmr measuring the spectrum at 235.4 MHz of each polymer dissolved in dimethylacetamide at 130° C. Integration of signals near −80 ppm arising from $CF_3$ groups was used to measure the amount of hexafluoropropylene (HFP), perfluorobutyl ethylene (PFBE) or perfluoro(ethyl vinyl ether) (PEVE) when present in the polymer. Integration of complex sets of signals from −105 to −135 ppm for $CF_2$ groups from TFE units in the interpolymer, corrected for the $CF_2$ content contributed by any other monomer when present, and from −150 to −220 ppm for CHF groups from the VF units in the interpolymer corrected for the CF content contributed by any other monomer when present provided complete compositional data for each sample.

For interpolymers containing TFE and CTFE where F-nmr signals for TFE and CTFE are complex multiplets that strongly overlap, nmr analysis alone could not determine the individual amounts of these components in the polymer. To fully resolve the composition, a mole ratio of TFE to CTFE was assumed and that, along with the nmr integrals for the combined TFE and CTFE and for the VF in the polymer, was used to calculate a mole percentage composition for each monomer component of the polymer. The calculated chlorine weight percentage for this composition was then compared to chlorine weight percentage determined by elemental chlorine analysis. The difference between the calculated and measured chlorine content was used to refine the estimate of the TFE to CTFE mole ratio and the monomer composition of the polymer was recalculated. This interative process was repeated until the calculated and measured chlorine contents converged on the same value giving the correct amount of each monomer in the polymer.

Infrared spectroscopy was used to identify the presence of ionic end groups.

Melt Viscosity

Melt viscosity was used as a relative measure of molecular weight. The melt viscosities of some of the polymers were extremely high and exhibited extreme melt fracture when extruded from the die of the capillary rheometer. This gave erratic results. In order to obtain a reliable measurement, mixtures of 40 weight % polymer in dimethylacetamide were used with the rheometer operated at 150° C. Viscosities were measured at shear rates ranging from 23.4 sec$^{-1}$ to 3516 sec$^{-1}$. Logarithmic plots of these data were fit to a linear least squares equation which was then used to calculate the viscosity at 100 sec$^{-1}$. This value is reported as MV.

Melting Point

Melting points ($T_m$) were measured in air by differential scanning calorimetry (DSC). Because the thermal history of the sample can affect the measurement of $T_m$, samples were heated to 250° C. at 10° C./min, then cooled and reheated at 10° C./min. The peak temperature of the endotherm observed during the reheat of the sample is reported as $T_m$.

Color

The color of each sample was measured with the aid of a Hunter Lab UltraScan spectrocolorimeter (Hunter Associates Laboratory, Reston, Va.) and compared to a standard white sample to obtain $\Delta L$, $\Delta a$ and $\Delta b$ values.

Accelerated Weathering Tests

Accelerated weathering tests were conducted according to test protocol specified in standard SAE J1960. The test is a method to gauge the performance of materials exposed to extreme environmental conditions due to sunlight, heat and moisture in the form of humidity, condensation or rain.

Heat of Fusion

Heat of fusion of the polymer was determined by integrating the area under the melting endotherm recorded by the DSC and is reported as $\Delta H_f$ in J/g.

Haze Measurement

Haze measurements were made on film with a Hunter Lab Ultra Scan Spectrocolorimeter manufactured by Hunter Associates Laboratory, Reston, Va. operated as described in the instrument instruction manual. Haze is reported as the percent diffuse transmission of total light transmission for the sample and provides an index of light scattering by the sample.

Surface Tension

Film surface tension measurements were made by the harmonic mean method of Wu (S. Wu, J. Poly. Sci., Part C, (34), 19, (1971)) using water and methylene iodide as the probe liquids.

Dispersion Viscosity

Dispersion viscosities were determined using a Brookfield cone and plate viscometer, Model DV-1 supplied by Brookfield Engineering Laboratories of Stoughton, Mass., operated according to manufacturer's instructions.

EXAMPLES

Examples 1-12

VF/TFE-Cationic End Groups

To a 400 mL Hastaloy high pressure tube was added 200 mL demineralized water and V-50 initiator 2,2'-azobis(2-amidinopropane) dihydrochloride (Wako Chemical Co., Dallas, Tex.), in the amount specified in Table 1. The tube was closed and cooled in an acetone dry ice slush, then evacuated and flushed with nitrogen three times to deoxygenate the contents of the tube. Monomers, vinyl fluoride and tetrafluoroethylene, were weighed into the tube in the amounts specified in Table 1 and the charged tube was placed in a thermostated shaker. The contents of the tube were heated to 70° C. and shaken for 1 hour. During that time the initial pressure in tube was in the range 10.9-6.8 MPa (1600-1000 psi) which dropped into the range 7.5-4.1 MPa (1100-600 psi) as the polymerization proceeded. The tube was cooled to room temperature and excess monomers were vented. A uniform polymer latex was formed. In some cases a portion of the polymer settled to the bottom of the sample container but this was easily redispersed by gentle stirring or shaking. The V-50 initiator used provided polymer with cationic endgroups of 2-amidinopropane hydrochloride. The polymer was separated from the latex on a vacuum filter by adding trisodium citrate to the solution to raise the pH to about 6.0 and coagulate the latex or by centrifugation and was then dried at 90-100° C. in an air oven.

Compositional data, melt viscosity (MV) and peak melting temperature ($T_m$) are reported in Table 1.

TABLE 1

|  |  | Example | | | | |
|---|---|---|---|---|---|---|
|  |  | 1 | 2 | 3 | 4 | 5 |
| Charge to Tube | | | | | | |
| Vinyl Fluoride | g | 90 | 95 | 98 | 90 | 95 |
| Tetrafluoroethylene | g | 22 | 11 | 5 | 22 | 11 |
| V-50 | g | 0.1 | 0.1 | 0.1 | 0.07 | 0.07 |
| $X_{TFE}$ | mol fract | 0.101 | 0.051 | 0.023 | 0.101 | 0.051 |
| Product | | | | | | |
| Polymer | g | 89 | 56 | 54 | 59 | 86 |
| TFE | mol % | 10.1 | 4.4 | 2.8 | 8.8 | 5.3 |
| TFE | wt % | 19.6 | 9.1 | 5.9 | 17.3 | 10.8 |
| MV | Pa·s | 740 | 460 | 480 | 590 | 571 |
| $T_m$ | °C. | 191 | 194 | 194 | 193 | 190 |

|  |  | Example | | | | | | |
|---|---|---|---|---|---|---|---|---|
|  |  | 6 | 7 | 8 | 9 | 10 | 11 | 12 |
| Charge to Tube | | | | | | | | |
| Vinyl Fluoride | g | 98 | 21 | 19 | 15 | 8 | 5 | 3 |
| Tetrafluoroethylene | g | 5 | 20 | 27 | 35 | 33 | 40 | 45 |
| V-50 | g | 0.07 | 0.1 | 0.05 | 0.05 | 0.05 | 0.05 | 0.05 |
| $X_{TFE}$ | mol fract | 0.023 | 0.305 | 0.395 | 0.518 | 0.655 | 0.786 | 0.873 |
| Product | | | | | | | | |
| Polymer | g | 88 | 32.4 | 36.2 | 17.8 | 45.3 | 41.9 | 38.2 |
| TFE | mol % | 1.8 | 29.5 | 35.7 | 37.1 | 54.8 | 59.9 | 71.8 |
| TFE | wt % | 3.8 | 47.6 | 54.7 | 56.2 | 72.5 | 76.4 | 84.7 |
| MV | Pa·s | 478 | 790 | 740 | 450 | 375 | 100 | 56 |
| $T_m$ | °C. | 191 | 197 | 198 | 204 | 204 | 205 | 210 |

Examples 13-15

VF/TFE Cationic End Groups

The procedures of Examples 1-12 were essentially followed except VA-044 initiator (2,2'-azobis(N,N'-dimethyleneisobutyroamidine) dihydrochloride, (Wako Chemical Co., Dallas, Tex.) was used in the amount specified in Table 2. The contents of the tube were heated to 45° C. and shaken for 8 hours. The pressure in tube ranged from 4.5-3.9 MPa (660-570 psi). This initiator provided polymer with cationic end groups of N,N'-dimethyleneamidino propane hydrochloride.

TABLE 2

| Example | | 13 | 14 | 15 |
|---|---|---|---|---|
| Charge to Tube | | | | |
| Vinyl Fluoride | g | 21 | 15 | 42 |
| Tetrafluoroethylene | g | 20 | 33 | 13 |
| VA-044 | g | 0.2 | 0.2 | 0.2 |
| $X_{TFE}$ | mol fract | 0.30 | 0.50 | 0.20 |
| Product | | | | |
| Polymer | g | 2.8 | 1.6 | 1.2 |
| TFE | mol % | 25.3 | 31.3 | 16.4 |
| TFE | wt % | 42.4 | 49.7 | 29.9 |
| $T_m$ | ° C. | 195 | 190 | 182 |

Examples 16-17

VF/TFE Anionic End Groups

The procedures of Examples 1-12 were essentially followed except ammonium persulfate (APS) was substituted for V-50 and the tube was maintained at 60° C. The amounts of materials charged to a 200 mL stainless steel tube and data obtained for the polymers made are reported in Table 3. The APS initiator provided polymer with anionic sulfate end groups.

TABLE 3

| Example | | 16 | 17 |
|---|---|---|---|
| Charge to Tube | | | |
| Water | mL | 100 | 100 |
| Vinyl Fluoride | g | 20 | 18 |
| Tetrafluoroethylene | g | 5 | 10 |
| APS | g | 0.1 | 0.1 |
| FC-143* | g | 0.25 | 0.25 |
| $X_{TFE}$ | mol fract | 0.103 | 0.204 |
| Product | | | |
| Polymer | g | 12.5 | 2.3 |
| TFE | mol % | 13.2 | 22.8 |
| TFE | wt % | 24.8 | 39.1 |
| Tm | ° C. | 197 | 198 |

*Fluorad ® FC-143, ammonium perfluorooctanoate, 3M Co., St. Paul, MN.

Examples 18-36

VF/TFE Cationic End Groups

A stirred jacketed stainless steel horizontal autoclave of 3.8 L (1 U.S. gal) or 38 L (10 U.S. Gal) capacity was used as the polymerization vessel. In each case the autoclave was equipped with instrumentation to measure temperature and pressure and with a compressor that could feed monomer mixtures to the autoclave at the desired pressure. The autoclave was filled to 70-80% of its volume with deionized water, then pressured to 2.1 MPa (300 psi) with nitrogen and vented three times. The water was then heated to 70° C. and monomers in the desired ratio were used to bring the autoclave pressure to 2.1 MPa. Initiator solution was then injected, 1.5 g V-50 in 50 mL of water for the 3.8 L autoclave or 8.5 g V-50 in 400 mL of water for the 38 L autoclave. The autoclave was then operated in a semibatch fashion in which the desired monomer mix (vinyl fluoride and tetrafluoroethylene) was added to the reactor as polymerization occurred to maintain constant pressure. To do this, the monomer feed was recycled through a loop from the high pressure side of the compressor to the low pressure side. Some of this recycle monomer stream was admitted to the autoclave by means of an automatic pressure regulated valve. Fresh monomer feed was added in the desired ratio to the balance of the recycle stream on low pressure side of the recycle loop to make up for the material sent to the reactor. Monomer feeds were continued until a predetermined amount to give the final latex solids was fed to the autoclave. About 2 hours was required to complete each polymerization. The feed was then stopped and the contents of the autoclave were cooled and vented. The polymer latex was easily discharged to a receiver as a milky homogeneous mixture. It was isolated on a suction filter by adding trisodium citrate to the solution in an amount sufficient to raise the pH to about 6.0 followed by adding toluene to the latex with rapid stirring such that the polymer:toluene ratio was about 2.0 and dried in an air oven at 90°-100° C. Data for each experiment and the polymer produced by it are presented in Table 4. Analysis of the product was done as described for Examples 1-12.

A sample of the polymer from Example 32 was examined by scanning electron microscopy. The particles were uniformly spherical or substantially spherical in shape and varied from about 0.3 to 0.4 μm (300 to 400 nm) in diameter.

TABLE 4

| | Reactor Conditions | | | | |
|---|---|---|---|---|---|
| Example | Volume L | Pressure psig | Temperature ° C. | Total Monomer Fed g | TFE in Monomer mol % |
| 18 | 3.8 | 301 | 72.3 | 57.7 | 17.9 |
| 19 | 3.8 | 303 | 70.5 | 63.2 | 24.0 |
| 20 | 3.8 | 258 | 70.5 | 530.0 | 24.0 |
| 21 | 3.8 | 255 | 69.9 | 523.8 | 17.9 |
| 22 | 3.8 | 302 | 70.3 | 537.7 | 25.0 |
| 23 | 3.8 | 298 | 70.6 | 750.4 | 25.0 |
| 24 | 3.8 | 301 | 70.0 | 852.7 | 25.0 |
| 25 | 3.8 | 301 | 70.5 | 753.9 | 25.0 |
| 26 | 3.8 | 298 | 70.9 | 90.5 | 16.4 |
| 27 | 3.8 | 296 | 70.9 | 84.1 | 30.6 |
| 28 | 3.8 | 294 | 70.8 | 107.9 | 54.5 |
| 29 | 3.8 | 294 | 70.1 | 115.2 | 72.4 |
| 30 | 3.8 | 298 | 70.8 | 554.6 | 16.4 |
| 31 | 3.8 | 298 | 70.9 | 557.7 | 30.7 |
| 32 | 3.8 | 304 | 70.6 | 500.6 | 39.9 |
| 33 | 3.8 | 307 | 70.6 | 96.7 | 89.9 |
| 34 | 38 | 297 | 70.0 | 4687.0 | 40.0 |
| 35 | 38 | 284 | 70.0 | 4721.5 | 40.0 |
| 36 | 3.8 | 301 | 70.0 | 475.0 | 45.0 |

| | Reactor Conditions | | | | | |
|---|---|---|---|---|---|---|
| | Monomer | | Polymer Produced | | | |
| Example | Solids wt % | Conversion wt % | Amount g | TFE content mol % | TFE content wt % | Melt Viscosity Pa·s | Tm ° C. |
| 18 | 0.46 | 24.1 | 13.9 | 10.4 | 20.1 | | 184 |
| 19 | 0.56 | 26.7 | 16.9 | 22.6 | 38.8 | | 194 |
| 20 | 14.9 | 92.4 | 489.8 | 24.6 | 41.5 | 453 | 194 |
| 21 | 12.8 | 79.0 | 414.0 | 9.4 | 18.4 | 114 | 187 |
| 22 | 14.9 | 61.1 | 328.4 | 22.5 | 38.7 | 358 | 194 |
| 23 | 19.6 | 71.6 | 537.6 | 23.2 | 39.7 | 405 | 194 |
| 24 | 23.8 | 76.3 | 650.5 | 23.2 | 39.6 | 367 | 193 |
| 25 | 19.8 | 76.2 | 574.8 | 23.2 | 39.6 | 486 | 194 |
| 26 | 0.35 | 11.9 | 10.8 | 16.6 | 30.2 | | 187 |
| 27 | 0.40 | 14.5 | 12.2 | 25.9 | 43.2 | | 190 |
| 28 | 0.41 | 11.4 | 12.3 | 38.7 | 57.8 | | 198 |
| 29 | 0.67 | 19.6 | 22.6 | 46.5 | 65.4 | | 203 |

TABLE 4-continued

| | | | | | | | |
|---|---|---|---|---|---|---|---|
| 30 | 8.7 | 48.5 | 268.8 | 15.2 | 28.1 | 269 | 188 |
| 31 | 6.9 | 40.9 | 228.1 | 27.8 | 45.5 | 430 | 194 |
| 32 | 12.5 | 79.7 | 399.0 | 38.8 | 58.0 | 759 | 201 |
| 33 | 0.4 | 11.9 | 11.5 | 64.8 | 80.0 | — | 219 |
| 34 | 10.9 | 67.6 | 3168.5 | 37.4 | 56.5 | 934 | 201 |
| 35 | 15.4 | 97.9 | 4624.0 | 36.1 | 55.1 | 951 | 200 |
| 36 | 11.2 | 75.7 | 359.5 | 40.9 | 60.1 | 877 | 202 |

Comparative Examples A-D

The method of Coffman and Ford, Example 5, was essentially followed except that water was not injected into the tube to maintain constant pressure after polymerization began. This was not necessary since by experience the pressure drops observed were less than the variation reported by Coffman and Ford for their experiments. In all cases 200 mL demineralized water and 0.4 g benzoyl peroxide were initially charged to a 400 mL Hastaloy tube. The polymerizations were conducted at 80° C. for 8 hours. Other materials were added as indicated below and polymers were analyzed as described for Examples 1-12. The polymer produced was not wetted by water and formed a highly heterogeneous mixture with the polymer floating in dry clumps on top of the aqueous phase which was completely transparent. Vigorous shaking did not disperse the clumps of polymer. A sample of the interpolymer produced by comparative Example A was examined by scanning electrom microscopy. The particles that formed varied in size from less than less than 1 μm to greater than 10 μm in breadth. The particles were of no uniform shape and tended to be agglomerated with one another forming channels and voids. Results are shown in Table 5.

TABLE 5

| | | Example | | | |
|---|---|---|---|---|---|
| | | A | B | C | D |
| Charged to tube | | | | | |
| Vinyl Fluoride | g | 30 | 35 | 40 | 18 |
| Tetrafluoroethylene | g | 30 | 19 | 10 | 57 |
| $X_{TFE}$ | mole fract | 0.32 | 0.20 | 0.10 | 0.59 |
| Product | | | | | |
| Polymer | g | 2.5 | 0.9 | 0.8 | 4.0 |
| TFE | mol % | 39.2 | 34.2 | 24.0 | 50.9 |
| TFE | wt % | 58.3 | 53.0 | 40.7 | 69.2 |
| Tm | ° C. | 199 | 192 | 191 | 206 |

Examples 37-42

To demonstrate that the polymers of this invention are easy to distinguish analytically from those of the art the infrared spectra of several samples were obtained. A reference spectrum of V-50 initiator was also obtained and showed a strong band at 1680 cm$^{-1}$ assignable to the amidine hydrochloride group. As shown in Table 6, the polymers made with V-50 initiator reveal the presence of amidine hydrochloride end groups by the presence of a weak band at 1680 cm$^{-1}$. This band is absent in the infrared spectrum of the polymers made with benzoyl peroxide but a band at 1603 cm$^{-1}$ is present due to phenyl end groups in the polymer derived from benzoyl peroxide. That band is absent in the spectrum of polymers made with V-50. Ratios of the intensities of these bands to a CH stretching band at 2975 cm$^{-1}$ are reported in Table 6.

The ionic end groups in the interpolymers of this invention are, thus, easily identifiable by spectroscopic techniques. As discussed above, this distinction in composition accounts for the dispersability of these interpolymers in aqueous media.

TABLE 6

| Example | Interpolymer From | Initiator | Mol % TFE in Z Polymer | $I_{1603}/I_{2975}$ | $I_{1680}/I_{2975}$ |
|---|---|---|---|---|---|
| 37 | Example 23 | V-50 | 23.2 | — | 0.03 |
| 38 | Example 25 | V-50 | 23.2 | — | 0.06 |
| 39 | Example 35 | V-50 | 36.1 | — | 0.33 |
| 40 | Comparative Example A | benzoyl peroxide | 39.2 | 0.20 | — |
| 41 | Comparative Example B | benzoyl peroxide | 34.2 | 0.25 | — |
| 42 | Comparative Example C | benzoyl peroxide | 24.0 | 0.31 | — |

Example 43

The interpolymers from Example 35 and Comparative Example A were made into 25% by weight dispersions in N-methylpyrrolidone by mixing 1.6 g of each polymer with 4.8 g of solvent. Each mixture was shaken on a paint shaker with stainless steel shot for 15 minutes to form a dispersion. Portions of each dispersion were spread side by side onto polyester film with the aid of a doctor knife to coat areas about 7.6 cm×17 cm. The polyester was clamped in a frame which was then placed into a circulating air oven heated to 207° C. and kept there for 3 minutes. The sample was then removed from the oven and cooled to room temperature.

The film from the polymer of Example 35 was stripped from the polyester. It was 12 μm (0.5 mil) thick, clear, smooth and free of defects such as pinholes or craters. The film was also flexible and strong. It could be creased sharply and snapped without breaking.

The film from Comparative Example A was also 12 μm thick but it was full of defects commonly called craters. These defects can arise when poor wetting occurs between the casting solvent and the polymer. When attempts were made to strip the film from the polyester it tended to crack and tear. The results of this experiment show the advantages of the interpolymers of this invention compared to those of the prior art.

Example 44

The advantages of VF/TFE interpolymers relative to homopolymer PVF may be shown in several ways. For example, the thermal stability of the interpolymers tends to increase as the TFE content of the polymer increases. This may be demonstrated by measuring the discoloration of a resin sample after compression molding. For this purpose, about 10 g of polymer was placed in a steel mold with a cavity 5.08 cm (2.0 in) in diameter and 0.318 cm (0.125 in) deep. The mold was closed and placed in a press heated to 220° C. The mold was allowed to heat 2 minutes before pressure was applied and then held under pressure at 220° C. for an additional time as shown in Table 7 below. The press was then cooled to about 120° C. and the mold removed from the press and opened to retrieve the sample. It was necessary to add 1 phr Irganox® 1035 antioxidant (Ciba-Geigy) to the PVF sample in order to avoid catastrophic decomposition of the homopolymer during the molding process, however, no antioxidants were added to the interpolymers.

The color of each sample was measured with the aid of a Hunter Lab UltraScan spectrocolorimeter and compared to a standard white sample to obtain ΔL, Δa and Δb values. The results of these measurements are reported in Table 7. A ΔE value, indicating the overall color change of the sample, is calculated from ΔL, Δa and Δb by determining the square root of the sum of the squares of these parameters. The negative ΔL values indicate the samples are darker than the standard, while the Δa and Δb values indicate the samples are redder and yellower than the standard. The increasing ΔE values for chips made from resin with lower TFE content shows them to discolor more during the compression molding process. Visually, the molded interpolymer chip made from resin containing 37.1% TFE was slightly yellow. The chip made from resin containing 10.1% TFE was a deeper yellow with a few brown streaks, and the homopolymer chip was dark brown. The lighter color for the interpolymer chips, in spite of the longer molding time used to make them and absence of antioxidant to prevent decomposition, shows the superior thermal stability of these materials relative to PVF.

TABLE 7

Color of VF/TFE Compression Molded Chips

| TFE Content Molding time @ 220° C. (min) | 0 mol % 2 | mol % 5 | 37.1 mol % 15 |
|---|---|---|---|
| ΔL | −49.0 | −25.6 | −21.7 |
| Δa | 25.7 | 17.9 | 9.6 |
| Δb | 28.1 | 40.0 | 37.7 |
| ΔE | 62.1 | 50.7 | 44.5 |

Example 45

Another way to demonstrate the advantages of VF/FE interpolymers relative to PVF is by accelerated weathering tests. SAE International has developed an accelerated test method to gauge the performance of materials exposed to extreme environmental conditions due to sunlight, heat and moisture in the form of humidity, condensation or rain. The test protocol is specified in standard SAE J1960. Transparent films 25 μm (1 mil) thick were subjected to this protocol and samples were withdrawn periodically for evaluation. The tensile properties of the films cut into strips 0.61 cm (0.25 in) wide were measured according to ASTM method D882. To facilitate comparisons, the percent retained tensile strength or percent retained ultimate elongation was calculated by dividing the measured property obtained after exposure by the value of that property obtained from the unexposed sample and multiplying by 100. These data are reported in Table 8. The data show that the films made from the interpolymers retain a much higher percentage of their original tensile properties than does the film made from PVF indicating the interpolymers have superior weathering characteristics.

TABLE 8

Weathering Data for VF/TFE Interpolymers

| | TFE Content (mol %) | | | | | |
|---|---|---|---|---|---|---|
| | 0% | | 26.4% | | 38.8% | |
| Exposure (kJ) | Retained Tensile Strength (%) | Retained Elongation (%) | Retained Tensile Strength (%) | Retained Elongation (%) | Retained Tensile Strength (%) | Retained Elongation (%) |
| 0 | 100 | 100 | 100 | 100 | 100 | 100 |
| 800 | 97 | 107 | 105 | 71 | 88 | 86 |
| 1600 | 93 | 61 | 102 | 53 | 94 | 107 |
| 2400 | 50 | 45 | 105 | 57 | | |
| 3200 | 10 | 27 | 107 | 169 | 83 | 92 |
| 4000 | 57 | 42 | | | | |
| 5500 | | | 102 | 64 | | |
| 5600 | | | | | 72 | 72 |

Example 46

Another way to demonstrate the advantages of VF/TFE interpolymers relative to PVF homopolymer is by measuring the surface tension of the resins. This is an important property because materials with low surface tension are not wetted by materials of higher surface tension and are, therefore, inherently resistant to staining. A low surface tension also facilitates cleaning in the event that some staining does occur since adhesive forces binding the stain to the surface are low. As a result, substrates covered with a film or coating of the lower surface tension material will look bright and new for longer periods of time and require less maintenance than substrates covered with a higher surface tension material.

The surface tension of VF/TFE interpolymers was determined from contact angle measurements using the harmonic mean method. (Wu, Polymer Interface and Adhesion, Marcel Dekker, New York, N.Y., 1982) The data are presented in Table 9 below. It is observed that the surface tension decreases as the amount of TFE in the interpolymer increases. As a consequence of the reduced surface tension, it was found that films stained with shoe polish or marking pens were more easily and completely cleaned with a dry cloth or one dampened with a solvent, such as 2-propanol, than similarly stained PVF films. The results further demonstrate the advantage of interpolymers.

TABLE 9

VF/TFE Interpolymer Surface Tension

| TFE Content (mol %) | Surface Tension (dyne/cm) |
|---|---|
| 0 | 38.4, 36.7 |
| 9.4 | 36.4 |

TABLE 9-continued

VF/TFE Interpolymer Surface Tension

| TFE Content (mol %) | Surface Tension (dyne/cm) |
|---|---|
| 24.6 | 31.3 |
| 38.8 | 27.3 |

Examples 47-54

VF/HFP Cationic End Groups

To a 400 mL Hastaloy high pressure tube was added 200 mL demineralized water and V-50 initiator (2,2'-azobis(2-amidinopropane) dihydrochloride (Wako Chemical Co., Dallas, Tex.), in the amount specified in Table 10. The tube was closed and cooled in an acetone dry ice slush, then evacuated and flushed with nitrogen three times to deoxygenate the contents of the tube. Monomers (vinyl fluoride and hexafluoropropylene) were weighed into the tube in the amounts specified in Table 10 and the charged tube was placed in a thermostated shaker. The contents of the tube were heated to 70° C. and shaken for 1 hour. During that time the initial pressure in tube was in the range 3.7-3.1 MPa (540-450 psi) which dropped into the range 1.3-0.5 MPa (190-68 psi) as the polymerization proceeded. The tube was cooled to room temperature and excess monomers were vented. A uniform polymer latex was formed with cationic end groups of 2-amidinopropanehydrochloride. The polymer was separated from the latex by centrifugation and was then dried at 90-100° C. in an air oven.

The polymers were analyzed by $^{19}$F-nmr measuring the spectrum at 235.4 MHz of polymer swollen in dimethylacetamide at 130° C. Integration of the signals from −70 to −75 ppm for the CF3 groups from the HFP units of the interpolymer and of the complex set of signals from −140 to −220 ppm for CHF groups from the VF units in the interpolymer corrected for the CF signal from the HFP provided the compositional data for the resins reported in Table 10.

Melting points were measured in air by DSC heated at a rate of 10° C./min. The peak melting temperature is reported as $T_m$ in Table 10. Interpolymers containing more than about 19 mole % HFP were found to be amorphous and showed no endotherms in the DSC. They are denoted "amorph" in Table 10.

Examples 55-60

VF/VINYL Ether Cationic End Groups

The procedure described for Examples 47-54 was used except perfluoropropylvinyl ether (PPVE) or perfluoromethylvinyl ether (PMVE) was substituted for HFP as shown in Table 11.

The polymers were analyzed by $^{19}$F-nmr as described above except the set of signals from −140 to −220 ppm for CHF groups from the VF units in the interpolymer was not corrected for the CF signal from the vinyl ethers since there is no overlap of signal.

Melting points were measured in air by DSC heated at a rate of 10° C./min. The peak melting temperature is reported as $T_m$ in Table 11. Some interpolymers containing high concentrations of vinyl ether were found to be amorphous and showed no endotherm in the DSC. They are denoted "amorph" in Table 11.

TABLE 11

| | | 55 | 56 | 57 | 58 | 59 | 60 |
|---|---|---|---|---|---|---|---|
| Charge to Tube | | | | | | | |
| VF | g | 6 | 12 | 35 | 6 | 23 | 62 |
| PPVE | g | 100 | 66 | 66 | | | |
| PMVE | | | | | 62 | 83 | 25 |
| V-50 | g | 0.1 | 0.1 | 0.1 | 0.2 | 0.1 | 0.1 |
| $X_{VE}$ | mol fract | 0.742 | 0.487 | 0.246 | 0.741 | 0.500 | 0.100 |
| Product | | | | | | | |
| Polymer | g | 8.7 | 31.1 | 21.1 | 22.1 | 43.7 | 57.1 |
| PPVE | mol % | 42.2 | 30.6 | 2.1 | | | |
| PMVE | mol % | | | | 43.4 | 22.6 | 3.4 |
| $T_m$ | ° C. | 117 | 125 | 183 | amorph | amorph | 180 |

Examples 61-72

Terpolymers with Cationic End Groups

A stirred jacketed stainless steel horizontal autoclave of 3.8 L (1 U.S. gal) capacity was used as the polymerization vessel. In each case the autoclave was equipped with instrumentation to measure temperature and pressure and with a compressor

TABLE 10

| | | 47 | 48 | 49 | 50 | 51 | 52 | 53 | 54 |
|---|---|---|---|---|---|---|---|---|---|
| | | | | Charge to Tube | | | | | |
| VF | g | 21 | 17 | 12 | 6 | 25 | 25 | 21 | 12 |
| HFP | g | 7* | 19 | 38 | 56 | 4 | 2 | 7 | 38 |
| V-50 | g | 0.2 | 0.2 | 0.2 | 0.2 | 0.1 | 0.1 | 0.1 | 0.2 |
| $X_{HFP}$ | mol fract | 0.093 | 0.225 | 0.493 | 0.741 | 0.047 | 0.024 | 0.093 | 0.493 |
| | | | | Product | | | | | |
| Polymer | g | 30 | 28.6 | 32 | 21.0 | 21.1 | 21.3 | 23.7 | 24.2 |
| HFP | mol % | 22.0 | 19.7 | 34.0 | 44.3 | 2.9 | 1.9 | 7.8 | 35.4 |
| HFP | wt % | 47.9 | 44.4 | 62.7 | 72.2 | 8.9 | 5.9 | 21.6 | 64.0 |
| $T_m$ | ° C. | amorph | amorph | amorph | amorph | 175 | 180 | 155 | amorph |

*suspected weighing error as recorded, actual amount was probably greater that could feed monomer mixtures to the autoclave at the desired pressure. The autoclave was filled to 70-80% of its volume with deionized water, then pressured to 2.1 MPa (300 psi) with nitrogen and vented three times. The water was then heated to 70° C. and VF (vinyl fluoride) and TFE (tetrafluoroethylene) monomers in the desired ratio were used to bring the autoclave pressure to 2.1 MPa. Initiator solution was then injected, 1.5 g V-50 initiator (2,2'-azobis(2-amidinopropane) dihydrochloride, Wako Chemical Co., Dallas, Tex.) in 50 mL of water, into the autoclave. The autoclave was operated in a semibatch fashion in which the desired VF and TFE mix was added to the reactor as polymerization occurred to maintain constant pressure. To do this, the monomer feed was recycled through a loop from the high pressure side of the compressor to the low pressure side. Some of this recycle monomer stream was admitted to the autoclave by means of an automatic pressure regulated valve. Fresh monomer feed was added in the desired ratio to the balance of the recycle stream on the low pressure side of the recycle loop to make up for the material sent to the reactor. When terpolymers containing monomers of perfluorobutyl ethylene (PFBE) or perfluoroethyl vinyl ether (PEVE) were made these monomers were fed to the autoclave separately as liquids by means of a pump. All monomer feeds were maintained until the predetermined amount was fed to obtain the desired solids in the autoclave. When hexafluoropropylene (HFP) was used as the termonomer, 50 g was injected into the reactor in one shot after about 10% of the total VF and TFE monomers had been fed. VF and TFE monomer feeds were continued until a predetermined amount to give the final latex solids was fed to the autoclave. About 2 to 4 hours was required to complete each polymerization depending on the termonomer used. The feed was then stopped and the contents of the autoclave were cooled and pressure was vented. The polymer latex was easily discharged to a receiver as a milky homogeneous mixture. Polymer was isolated on a suction filter by adding trisodium citrate to the solution in an amount sufficient to raise the pH to about 6.0 and dried in an air oven at 90°-100° C. The V-50 initiator used provided polymer with cationic endgroups of 2-amidinopropane hydrochloride. Data for each example showing reactor conditions and the polymer produced by those conditions are presented in Table 12.

Casting dispersions of polymer were prepared by adding 8.0 g of polymer and 15.0 g of propylene carbonate into a bottle along with 25 g of stainless steel shot about 0.32 cm diameter. The bottles were tightly stoppered and placed on a paint shaker and milled for 15 minutes to yield uniform dispersions without polymer lumps. In some cases, particularly for the resins with very low surface energies, the dispersions tended to retain bubbles after milling. This was remedied by adding a small amount of methanol, ca. 5 mL, to the dispersion to facilitate bubble release. Portions of the dispersions were then poured onto a sheet of polyester film held on a flat vacuum plate and drawn down with the aid of a doctor knife to yield a thin uniform coating. The coated film was clamped into a frame and placed into a forced draft air oven heated to 204° F. for 3 minutes. The film was removed from the oven and the frame, and the dry fluoropolymer film was stripped from the polyester. Each fluoropolymer film was 1 mil thick. Part of the film was used to measure haze and part was used to measure surface tension.

Examination of the data in Table 13 shows decreases in both the melting point and heat of fusion for the terpolymers as the concentration of termonomer increases. These results demonstrate that the termonomer is disrupting the crystalline structure of the polymer, and that the effect is generally in proportion to the amount of termonomer incorporated into the polymer. Thus, the terpolymers have lower crystallinity than the interpolymer of equivalent [VF]/[TFE]. As a consequence of the reduced crystallinity, certain practical advantages for the terpolymers have been observed.

For example, the data in Table 13 also show a precipitous drop in film haze after the first increment of termonomer is incorporated into the polymer. There is a general tendency for the polymer films with the lower haze to have higher termonomer content, and thus correlate with the decrease in polymer crystallinity.

It was found that the terpolymers form stable solutions at room temperature in common organic solvents like ketones, esters and some ethers when sufficient termonomer is incorporated into the polymer. The data in Table 13 report terpolymers soluble in THF, for example. These solutions were prepared by warming polymer and solvent in bottles to about 70° C. and shaking them frequently. When dissolution was complete and the solutions were allowed to cool to room temperature they remained homogeneous fluids that were coated onto glass plates and allowed to dry in air at ambient temperatures. Clear glossy coatings well adhered to the glass were formed for the resins denoted as soluble in Table 13. The insoluble resins remained as finely divided particulates even when warmed in THF and only formed white powdery coatings upon air drying that were easily wiped away from the glass plates.

The data in Table 13 also illustrate the effect the termonomer has on the surface tension of films and coatings made from the terpolymers. It was noted that surface tension decreases as the termonomer content of the polymer increases. Low surface tensions are well known in the art, see for example Inoue, et al., J. Appl Polym. Sci., 40, 1917 (1990), to confer superior release properties to films and coatings making these valuable materials for items such as release sheets, films or papers, mold release sprays and die lubricants. The low surface tensions also make it difficult for soil and stains to stick to coated surfaces or articles such as wall panels, fabrics and carpets. These terpolymer resins are also especially useful for conferring low surface tensions when used in blends with higher surface tension polymers.

TABLE 12

Conditions For Terpolymer Preparation

| | Reactor Conditions | | | | | |
|---|---|---|---|---|---|---|
| Example No. | Reactor Pres psig | Reactor Temp ° C. | Termonomer | Termon Feed Rate gpm | TFE Feed Rate gpm | VF Feed Rate gpm |
| 61 | 297 | 69.9 | PFBE | 0.26 | 2.08 | 1.17 |
| 62 | 291 | 70.0 | NONE | 0.00 | 2.08 | 1.17 |
| 63 | 291 | 69.8 | PFBE | 0.13 | 2.15 | 1.21 |
| 64 | 292 | 69.5 | PFBE | 0.26 | 2.08 | 1.17 |
| 65 | 297 | 70.3 | PFBE | 0.40 | 2.00 | 1.13 |
| 66 | 295 | 70.3 | PFBE | 0.26 | 2.08 | 1.26 |
| 67 | 290 | 69.8 | PFBE | 0.30 | 1.50 | 0.84 |
| 68 | 290 | 70.0 | NONE | 0.00 | 2.24 | 1.26 |
| 69 | 295 | 70.4 | HFP | 50.0* | 2.24 | 1.26 |
| 70 | 294 | 70.3 | HFP | 50.0* | 2.24 | 1.26 |
| 71 | 298 | 70.0 | PEVE | 0.26 | 2.08 | 1.26 |
| 72 | 299 | 70.2 | PEVE | 0.39 | 2.00 | 1.13 |

TABLE 12-continued

Conditions For Terpolymer Preparation

| | Reactor Conditions | | Polymer Produced | | | | |
|---|---|---|---|---|---|---|---|
| Example No. | Monomer Fed g | Reactor Solids wt % | Polym Made g | VF Conc mol % | TFE Conc mol % | Termon Conc mol % | MV Pa·s |
| 61 | 490.0 | 14.9 | 416.8 | 58.0 | 39.9 | 2.06 | 299 |
| 62 | 550.1 | 13.5 | 379.0 | 59.7 | 40.3 | 0.00 | 787 |
| 63 | 544.4 | 13.6 | 383.1 | 60.0 | 39.6 | 0.41 | 629 |
| 64 | 545.9 | 13.1 | 371.6 | 58.3 | 40.6 | 1.12 | 576 |
| 65 | 549.9 | 13.0 | 372.3 | 58.4 | 38.4 | 3.21 | 155 |
| 66 | 545.0 | 13.5 | 383.3 | 60.8 | 37.0 | 2.20 | 314 |
| 67 | 548.0 | 13.4 | 383.4 | 57.8 | 38.7 | 3.51 | 123 |
| 68 | 537.1 | 14.7 | 473.9 | 58.4 | 41.6 | 0.00 | 556 |
| 69 | 535.0 | 15.6 | 508.3 | 60.0 | 39.1 | 0.94 | 789 |
| 70 | 540.2 | 14.5 | 466.4 | 60.5 | 38.5 | 1.02 | 914 |
| 71 | 545.5 | 13.5 | 378.8 | 61.7 | 37.7 | 0.61 | 393 |
| 72 | 544.2 | 13.0 | 365.0 | 59.7 | 39.4 | 0.94 | 402 |

*All 50 g of HFP injected into the reactor after 10% of TFE was fed.

TABLE 13

Vinyl Fluoride Terpolymer Properties

| Example No. | VF (mol %) | TFE (mol %) | PFBE (mol %) | HFP (mol %) | PEVE (mol %) |
|---|---|---|---|---|---|
| 61 | 58.0 | 39.9 | 2.06 | | |
| 62 | 59.7 | 40.3 | 0.00 | | |
| 63 | 60.0 | 39.6 | 0.41 | | |
| 64 | 58.3 | 40.6 | 1.12 | | |
| 65 | 58.4 | 38.4 | 3.21 | | |
| 66 | 60.8 | 37.0 | 2.20 | | |
| 67 | 57.8 | 38.7 | 3.51 | | |
| 68 | 58.4 | 41.6 | | 0.00 | |
| 69 | 60.0 | 39.1 | | 0.94 | |
| 70 | 60.5 | 38.5 | | 1.02 | |
| 71 | 61.7 | 37.7 | | | 0.61 |
| 72 | 59.7 | 39.4 | | | 0.94 |

| Example No. | $T_m$ (°C.) | $\Delta H_f$ (J/g) | Haze (%) | Surface Tension (dyne/cm) | Solubility THF* |
|---|---|---|---|---|---|
| 61 | 184 | 20.1 | 3.67 | 22.2 | soluble |
| 62 | 200 | 26.5 | 8.65 | 25.5 | insoluble |
| 63 | 192 | 22.2 | 3.45 | 23.5 | insoluble |
| 64 | 190 | 20.0 | 3.21 | 22.5 | soluble |
| 65 | 160 | 13.3 | 1.03 | 18.6 | soluble |
| 66 | 172 | 18.1 | 0.87 | 22.5 | soluble |
| 67 | 161 | 13.5 | 0.73 | 20.7 | soluble |
| 68 | 204 | 26.4 | 7.10 | 30.8 | insoluble |
| 69 | 191 | 23.7 | 3.89 | 36.9 | insoluble |
| 70 | 191 | 22.6 | 0.41 | 27.3 | insoluble |
| 71 | 190 | 24.7 | 3.57 | 25.2 | soluble |
| 72 | 190 | 21.1 | 3.42 | 25.8 | soluble |

*Solutions are 5% (w/v) polymer in THF except 61, 71 and 72 which are 2.5% (w/v)

Examples 73-75

VF/TFE with Anionic End Groups

A stirred jacketed stainless steel horizontal autoclave of 7.6 L (2 U.S. gal) capacity was used as the polymerization vessel. In each case the autoclave was equipped with instrumentation to measure temperature and pressure and with a compressor that could feed monomer mixtures to the autoclave at the desired pressure. The autoclave was filled to 55-60% of its volume with deionized water containing a surfactant as indicated in Table 14 below. It was then pressured to 2.1 MPa (300 psi) with nitrogen and vented three times. The water was then heated to 90° C. and monomers in the desired ratio were used to bring the autoclave pressure to 2.1 MPa. Initiator solution was prepared by dissolving 2 g APS in 1 L of deionized water. The initiator solution was fed to the reactor at a rate of 25 mL/min for a period of five minutes and then the feed rate was reduced and maintained at 1 mL/min for the duration of the experiment. The autoclave was operated in a semibatch fashion in which the desired monomer mix was added to the reactor as polymerization occurred to maintain constant pressure. To do this, the monomer feed was recycled through a loop from the high pressure side of the compressor to the low pressure side. Some of this recycle monomer stream was admitted to the autoclave by means of an automatic pressure regulated valve. Fresh monomer feed was added in the desired ratio to the balance of the recycle stream on low pressure side of the recycle loop to make up for the material sent to the reactor. Monomer feeds were continued until a predetermined amount to give the final latex solids was fed to the autoclave. About 2 hours was required to complete each polymerization. The feed was then stopped and the contents of the autoclave were cooled and vented. The polymer latex was easily discharged to a receiver as a milky homogeneous mixture. Polymer was isolated on a suction filter by adjusting the latex pH to about 5.0 with 10% NaOH and adding 4.0 g $MgSO_4 \cdot 7H_2O$ dissolved in water per liter of latex. The filter cake was washed with water and dried in an air oven at 90°-100° C. Data for each experiment and the polymer produced by it are presented in Table 14. Analysis of the product was done as described for Examples 1-12.

TABLE 14

| | Reactor Conditions | | | | | |
|---|---|---|---|---|---|---|
| Example | Reactor Pressure MPa | Surfactant* | Temperature °C. | Total Monomer Fed g | TFE in Monomer mol % | Solids wt % |
| 73 | 2.1 | Fluorad ® FC118 | 90 | 1381.0 | 43.3 | 23.3 |
| 74 | 2.1 | Fluorad ® FC118 | 90 | 1368.8 | 43.0 | 22.7 |
| 75 | 2.1 | Zonyl ® FS62 | 90 | 1049.6 | 39.2 | 18.6 |

| | Polymer Produced | | | |
|---|---|---|---|---|
| Example | Amount g | TFE mol % | MV Pa·s | Tm °C. |
| 73 | 1345.8 | 43.3 | 783 | 205 |
| 74 | 1386.3 | 43.0 | 747 | 205 |
| 75 | 1042.9 | 39.2 | 495 | 199 |

*50 mL of Fluorad ® FC118 20% aqueous ammonium perfluorooctanoate, 3M Corp., St. Paul, MN
7.5 mL of Zonyl ® FS62 33% aqueous perfluorohexylethane sulfonic acid, DuPont Co., Wilmington, DE

Examples 76-91

VF/TFE/CTFE Terpolymers

A stirred jacketed stainless steel horizontal autoclave of 7.6 L (2 U.S. gal) capacity was used as the polymerization vessel. In each case the autoclave was equipped with instrumentation to measure temperature and pressure and with a compressor that could feed monomer mixtures to the autoclave at the desired pressure. The autoclave was filled to 55-60% of its volume with deionized water containing a surfactant as indicated in Table 15 below. It was then pressured to 2.1 MPa (300 psi) with nitrogen and vented three times. The water was then heated to 90° C. and monomers in the desired ratio were used to bring the autoclave pressure to 2.1 MPa. Initiator solution was prepared by dissolving 2 g APS in 1 L of deionized water. The initiator solution was fed to the reactor at a rate of 25 mL/min for a period of five minutes. The polymerization was allowed to continue until a pressure drop of 20 psig was observed. The excess monomers were then vented and the entries in this column marked by * are glass transition values determined by DSC and represent compositions that are amorphous materials without significant crystalline content. The color of the resins is also noted in Table 15. Some of the compositions with VF contents higher than about 35 wt % tended to discolor during drying.

High quality aqueous dispersions such as those prepared in Examples 76-91 are suitable for spray drying to produce powder coatings on a variety of substrates. Compositions from Table 15 can be selected on the basis of thermal stability and color for such application.

TABLE 15

| Example | Monomer Charge (wt %) | | | Total Monomer (g) | Polym Time (min) | Polymer Made (g) | Polymer Comp (mol %) | | |
|---|---|---|---|---|---|---|---|---|---|
| | TFE | VF | CTFE | | | | TFE | VF | CTFE |
| 76 | 15.7 | 79.0 | 5.3 | 201.6 | 26 | 23 | 11.4 | 83.2 | 5.4 |
| 77 | 44.2 | 4.9 | 50.9 | 244.0 | 9 | 40 | 39.6 | 31.8 | 28.7 |
| 78 | 0.0 | 49.9 | 50.1 | 224.1 | 6 | 36 | 0.0 | 59.2 | 40.8 |
| 79 | 79.7 | 4.9 | 15.4 | 234.4 | 8 | 32 | 53.8 | 37.0 | 9.2 |
| 80 | 44.9 | 5.2 | 49.9 | 262.3 | 7 | 40 | 28.6 | 33.4 | 38.1 |
| 81 | 33.5 | 32.9 | 33.6 | 213.7 | 6 | 35 | 18.5 | 58.2 | 23.3 |
| 82 | 46.6 | 47.9 | 5.5 | 212.4 | 11 | 30 | 27.0 | 68.9 | 4.1 |
| 83 | 46.9 | 47.6 | 5.5 | 210.1 | 11 | 31 | 26.4 | 69.5 | 4.1 |
| 84 | 80.1 | 13.9 | 6.0 | 231.8 | 8 | 34 | 44.8 | 51.3 | 3.9 |
| 84 | 80.1 | 5.7 | 14.3 | 234.4 | 10 | 38 | 54.0 | 37.6 | 8.5 |
| 86 | 40.3 | 32.6 | 27.2 | 226.0 | 6 | 33 | 19.6 | 59.5 | 20.9 |
| 87 | 0.0 | 79.5 | 20.5 | 194.2 | 11 | 30 | 0.0 | 80.2 | 19.8 |
| 88 | 45.2 | 5.0 | 49.9 | 293.4 | 6 | 44 | 37.3 | 36.1 | 26.6 |
| 89 | 0.0 | 50.0 | 50.0 | 243.9 | 6 | 37 | 0.0 | 58.7 | 41.3 |
| 90 | 0.0 | 19.9 | 80.1 | 342.3 | 11 | 51 | 0.0 | 33.9 | 66.1 |
| 91 | 14.4 | 5.2 | 80.4 | 310.0 | 10 | 40 | 9.2 | 28.8 | 61.9 |

| Example | Polymer Comp (wt %) | | | Tm (° C.) | Color |
|---|---|---|---|---|---|
| | TFE | VF | CTFE | | |
| 76 | 20.4 | 68.4 | 11.2 | 164 | grey |
| 77 | 45.2 | 16.7 | 38.1 | 131 | white |
| 78 | 0.0 | 36.4 | 63.6 | 40* | white |
| 79 | 66.0 | 20.8 | 13.1 | 190 | white |
| 80 | 32.3 | 17.4 | 50.3 | 127 | white |
| 81 | 25.6 | 37.0 | 37.5 | 129 | off white |
| 82 | 42.5 | 50.0 | 7.6 | 179 | grey |
| 83 | 41.8 | 50.6 | 7.6 | 178 | grey |
| 84 | 61.4 | 32.4 | 6.2 | 193 | off white |
| 84 | 66.5 | 21.3 | 12.2 | 193 | white |
| 86 | 27.4 | 38.4 | 34.2 | 137 | off white |
| 87 | 0.0 | 61.5 | 38.5 | 85 | light grey |
| 88 | 44.0 | 19.5 | 36.5 | 126 | white |
| 89 | 0.0 | 36.0 | 64.0 | 39* | white |
| 90 | 0.0 | 16.8 | 83.2 | 35* | white |
| 91 | 9.8 | 14.0 | 76.2 | 35* | white |

Notes:
(1) 2 g APS/L, 25 ml/min for 5 min to initiate, then 1 ml/min, 15.0 g Zonyl ® FS-62 in 4300 ml DI water precharge, 300 psig, 90° C., Agitator 80 rpm
(2) 250° C./100/sec
*Tg not Tm reactor contents were cooled. The polymer latex was easily discharged to a receiver as a turbid homogeneous mixture. Polymer was isolated on a suction filter by adding 7.0 g $(NH_4)_2CO_3$ dissolved in water per liter of latex. The filter cake was washed with water and dried to constant weight in an air over at 90°-100° C. Data for each experiment and the polymer produced by it are presented in Table 15. Analysis of the product was done as described above in the test methods. The results in Table 15 show a broad range of polymer compositions. Some of these are semicrystalline materials that have melting points ranging from about 85° C. to about 193° C. as reported in Table 15 in the column labeled Tm. The Examples 92-94

VF/TFE/CTFE Terpolymers

The procedure for Examples 73-91 was essentially followed except that the autoclave was operated in a semibatch fashion in which the desired monomer mix was added to the reactor as polymerization occurred to maintain constant pressure. This permitted obtaining higher reactor solids producing more polymer per batch. To do this, the monomer feed was adjusted relative to the monomer precharge to account for the difference in reactivity of the monomers during the polymerization. This monomer feed was recycled through a loop from the high pressure side of the compressor to the low pressure side. Some of this recycle monomer stream was admitted to the autoclave by means of an automatic pressure regulated valve. Fresh monomer feed was added in the desired ratio to the balance of the recycle stream on low pressure side of the recycle loop to make up for the material sent to the reactor. Monomer feeds were continued until a predetermined amount to give the final latex solids was fed to the autoclave. About 2-3 hrs. was required to complete each polymerization. When the goal amount of monomers were fed to the reactor, feed was stopped, the reactor was vented of excess monomers and then cooled. The polymer was isolated and analyzed as described in Examples 73-91, except that 70 mL of HFC 4310 (1,1,1,2,3,4,4,5,5,5-decafluoropentane) was added per liter of latex with rapid stirring to convert the coagulum into a crumb for easy filtering. Data for these examples is presented in Table 16.

TABLE 16

| Example | Monomer Precharge (wt %) | | | Monomer Feed (wt %) | | | Total Monomer (g) | Reactor Solids (%) | Polymer Made (g) |
|---|---|---|---|---|---|---|---|---|---|
| | TFE | VF | CTFE | TFE | VF | CTFE | (g) | (%) | (g) |
| 92 | 45.4 | 4.7 | 49.8 | 37.7 | 18.4 | 44.0 | 1188.3 | 17.3 | 966 |
| 93 | 80.1 | 4.8 | 15.2 | 64.1 | 21.4 | 14.5 | 1149.7 | 17.8 | 993 |
| 94 | 57.0 | 9.7 | 33.4 | 49.3 | 22.7 | 28.1 | 1126.0 | 19.6 | 1114 |

| Example | Polymer Composition (mole %) | | | Polymer Composition (wt %) | | | MV Pa·s | Tm (°C.) | Tg (°C.) |
|---|---|---|---|---|---|---|---|---|---|
| | TFE | VF | CTFE | TFE | VF | CTFE | | | |
| 92 | 44.2 | 33.5 | 22.3 | 51.7 | 18.0 | 30.3 | 2690 | 149 | 20 |
| 93 | 57.0 | 37.2 | 5.7 | 70.5 | 21.2 | 8.3 | 2740 | 203 | 53 |
| 94 | 46.9 | 38.9 | 14.2 | 57.7 | 22.0 | 20.3 | 2354 | 172 | 33 |

(1) 2 g APS/L, 25 ml/min for 5 min to initiate, then 1 ml/min, 7.0 g FS-62 in 4300 ml DI water precharge, 300 psig, 90° C., Agitator 80 rpm
(2) MV determined at 250° C. @ 100/sec

What is claimed is:

1. An aqueous dispersion comprising about 70 to 95% by weight water and 5 to 30% by weight of an interpolymer dispersed therein comprising polymer units derived from 10-90 mol % vinyl fluoride and 90-10 mol % of at least one highly fluorinated monomer, said interpolymer being characterized by the presence of ionic end groups.

2. The aqueous dispersion of claim 1 wherein said interpolymer comprises polymer units derived from 30-70 mol % vinyl fluoride and 70-30 mol % of at least one highly fluorinated monomer.

3. The aqueous dispersion of claim 1 wherein said interpolymer comprises polymer units derived from 60-80 mol % vinyl fluoride and 20-40 mol % of at least one highly fluorinated monomer.

4. The aqueous dispersion of claim 1 comprising 85-90% by weight water and 10-15% of interpolymer.

5. The aqueous dispersion of claim 1 wherein the viscosity of the dispersion is less than 0.5 Pa·s.

6. The aqueous dispersion of claim 1 wherein said interpolymer has a particle size of about 200 nm to about 400 nm.

7. A nonaqueous dispersion comprising a polar organic solvent and particles of the interpolymer dispersed therein comprising polymer units derived from 10-90 mol % vinyl fluoride and 90-10 mol % of at least one highly fluorinated monomer, said interpolymer being characterized by the presence of ionic end groups.

8. The nonaqueous dispersion of claim 7 wherein said interpolymer comprises polymer units derived from 30-70 mol % vinyl fluoride and 70-30 mol % of at least one highly fluorinated monomer.

9. The aqueous dispersion of claim 7 wherein said interpolymer comprises polymer units derived from 60-80 mol % vinyl fluoride and 20-40 mol % of at least one highly fluorinated monomer.

10. The aqueous dispersion of claim 7 wherein said interpolymer has a particle size of about 200 nm to about 400 nm.

11. The nonaqueous dispersion of claim 7 wherein said polar solvent is selected from the group consisting of propylene carbonate, N-methyl pyrrolidone, γ-butyrolacetone, dimethylacetamide, or dimethylsulfoxide.

12. The nonaqueous dispersion of claim 7 wherein the viscosity of said dispersion is in the range of 0.5 to 10 Pa·s.

13. The nonaqueous dispersion of claim 7 wherein the viscosity of said dispersion is in the range of 1.5 to 3.5 Pa·s.

14. A self-supporting film cast from the nonaqueous dispersion of claim 7.

15. A coated article comprising a substrate having at least one surface with a coating formed from the nonaqueous dispersion of claim 7.

16. The coated article of claim 15 wherein the substrate is selected from the groups consisting of metal, plastic, ceramic, glass, concrete, fabric and wood.

17. A laminated article comprising a substrate and said film of claim 14 adhered to at least one surface of the substrate.

18. The laminated article of claim 17 wherein said substrate is selected from the group consisting of metal, plastic, ceramic, glass, concrete, fabric and wood.

* * * * *